United States Patent [19]
Richter

[11] 3,826,383
[45] July 30, 1974

[54] AUTOMATIC HANDLING APPARATUS

[75] Inventor: Hans Richter, Augsburg, Germany

[73] Assignee: Keller & Knappich Augsburg, Zweigniederlassung der Industrie-Werke Karlsruhe Ausberg Aktiengesellschaft, Augsburg, Germany

[22] Filed: May 25, 1973

[21] Appl. No.: 365,641

[30] Foreign Application Priority Data
May 31, 1972 Germany.......................... 2226407

[52] U.S. Cl.......... 214/1 BD, 214/1 BV, 214/1 CM, 214/147 R
[51] Int. Cl............................................. B66c 1/10
[58] Field of Search.. 214/1 BC, 1 BD, 1 BH, 1 BV, 214/1 CM, 147 R, 147 G

[56] References Cited
FOREIGN PATENTS OR APPLICATIONS
26,706  1/1964  Germany.......................... 214/147 R
898,669  10/1954  Germany.......................... 214/147 R Primary Examiner—Robert J. Spar
Assistant Examiner—George F. Abraham
Attorney, Agent, or Firm—Allison C. Collard

[57] ABSTRACT

A mechanical handling apparatus controlled by a recorded but variable program has a rotatable base. An upper arm is pivoted on the base. A forearm is pivoted on the upper arm, and a wrist movement and gripper are pivoted on the end of the forearm. Each part subject to rotary motion is driven by an epicyclic gear located as near as possible to the part to reduce slack or backlash. Each gear is driven through belts and bevel gears by an electric motor located in the base. The program is pre-recorded and all movements of the apparatus when in use generate signals which are compared with the program, which thus controls the motor drives.

10 Claims, 6 Drawing Figures

AUTOMATIC HANDLING APPARATUS

The invention relates to an automatic handling mechanism controlled by a variable program. The apparatus has a gripper or holder rotatable about vertical and horizontal axes and fitted on an arm with variable sweep. The apparatus may be used for handling a workpiece during welding, mounting, boring, loading, unloading, transporting, finishing and the like.

In accordance with the present invention there is provided an automatic handling apparatus that is controlled by a variable program. The apparatus comprises a hand, a gripper or holder that is movable on an arm which is pivotal about a vertical axis, tiltable about a horizontal axis, and that has a variable sweep. The rotary drives of both the hand member (that is able to swivel about its own first swivel axle line) and a first forearm member (that is able to swivel about a second swivel axle line at right angles to the first swivel axle line) are taken via pairs of bevel gears and reduction gears, that are located in a directly adjacent wrist member. The wrist member forms the end of a swivel tube of the arm. The wrist member is pivotal about its own third swivel axle line extending at right angles to the second swivel axle of the first forearm member within which tube two coaxial hollow shafts are mounted. The shafts receive their drives at the arm joint through bevel gears, belt pulleys and belts all of which are rotated by electric motors.

According to the invention, the rotary drives for the hand members are taken through reduction gears located in their direct vicinity thereby providing precise adjustments. The rotatability of two hand members widens the range of use and operation and are easily controllable by simple driving members such as bevel gears. The rotatability of the wrist member supporting the two forehand members provides a freedom of movement for all co-ordinates, and permits its rotary drive (like that of the two hand members) to be obtained by using three hollow shafts coaxially located in the arm and by bevel gears, belt pulleys and belts from electric motors. The motor may be located remotely from the hand. These electric motors, due to the high reduction ratio of the gears, may operate at high speeds. Any elasticity or play in their motion transmitting parts is reduced by the reduction gears to such a small fraction that they have little or no adverse effect.

According to the invention, the arm supporting the hand members is connected at its rear end as a forearm to an elbow joint having its axis extending parallel to the vertical reciprocating axis, and to an intermediate arm or upper arm to form a pair of arms. A strut is connected to the upper arm by a pivot joint with an axis parallel with the horizontal pivot, the other end of the strut engages in a longitudinal guide of the lower or forearm. This is accomplished by a sleeve on the pivot tube, and having a carrier shaft of the strut retained by a mechanical drive in a desired pivot angle position, for which an electric motor with reduction gearing is used.

This construction increases the precision of the handling movements, since the strut action on the unsupported forearm length is reduced and stability is improved. A reduction of the torque exerted on the pivot joint shaft carrier is obtained in the inventive device so that higher loads may be acted on by the hand.

The reduction gears used preferably have an elliptical disc with a shrunk-on ball bearing race. On this race runs a resilient externally toothed steel bush, the teeth thereof at the ends of the longer elliptic axis engage the teeth of a steel ring provided with internal teeth. The ring teeth have a greater number of teeth than that of the bush but have the same pitch. These gears having only three main parts but give a high reduction ratio, up to 320:1, hence permitting the use of high speed electric motors and avoiding the use of multimembered gear elements with their unavoidable clearances. This improves accuracy of handling by a factor of 100 or more, and this improved accuracy can be ensured and maintained.

These reduction gears are mounted coaxially with the shaft to be rotated. This results in a simple, space saving structure.

There are toothed or V-belts between each reduction gear and its respective electric motor. The electric motors are preferably accommodated on or are in a rotary base from which the belts are guided with the different pivot link shafts. The rotary drive for the movements of the hand, forehand and wrist are conducted by means of toothed or V-belts through an elbow joint.

Since the wrist member is mounted on the end of a rotary tube within the forearm that is non-rotating and has a large diameter, the reduction gear may be located on its end adjacent to the elbow joint.

Preferably the inventive joints pivot by means of adjustable wire ball bearings, in which the balls run on two wires provided in recesses of two outer and inner ball races that are adjustable from one another so that play or slack can be greatly reduced.

Therefore, it is an object of the present invention to provide a programable automatic handling mechanism that has accurate control in all coordinance.

It is another object of the present invention to provide an automatic handling device that increases positional accuracy and reduces the backlash associated with prior devices.

Other objects and features of the present invention will become apparent from the following detailed description considered in connection with the accompanying drawings. It is to be understood, however, that the drawings are designed for the purpose of illustration only and not as a definition of the limits of the invention to which reference should be made to the appended claims.

In the drawings, wherein the same reference character denotes an identical element throughout the several views.

Figure 6:
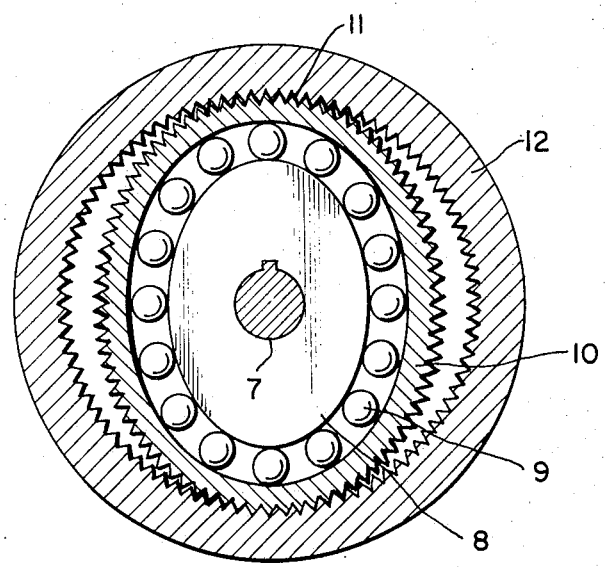
FIG. 6 is a section through the lower arm gear on an enlarged scale.

Referring now to the Figures there is shown the apparatus with a fixed frame 1. A rotatable disc 3 is mounted in frame 1 by means of a ball bearing 2 to act as support for a swivel base 4 rotatable about the axis I—I. Its rotation is effected by an electric motor 5 mounted on the disc 3 via a toothed or V-belt 6 fastened on shaft 7, which extends along the axis I—I. Secured to the lower end of this shaft 7 is an elliptical disc 8, best seen in FIG. 6. Shrunk onto disc 8 is a ball ring 9 and a resilient steel bush 10. This steel bush 10 is provided with external teeth. The teeth in the region of the larger elliptical axis are in constant engagement with the internal teeth of a rigid steel ring 12. Ring 12 has the same tooth pitch 11 but has more teeth. The internally toothed rigid steel ring 12 is mounted on the frame 1. The power drive of the reduction gear is transmitted by the resilient steel bush 10 through a cylindrical extension bush 13 on its upper face to the rotatable disc 3, through a coupling 14. A fixed sump 76 holds oil for the gear.

Figure 1:
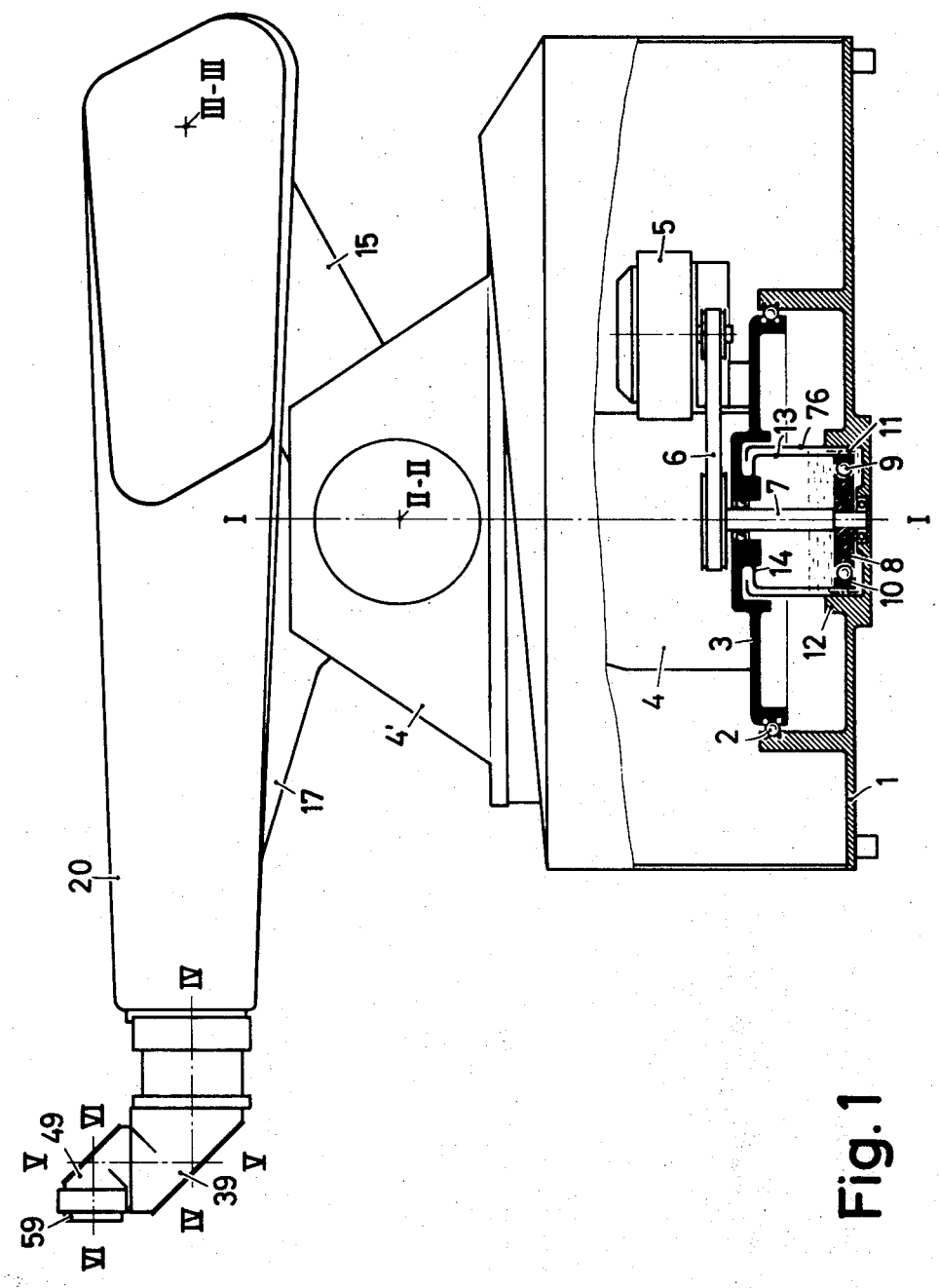
FIG. 1 is a side view, partly in section, of the inventive apparatus.
Figure 2:
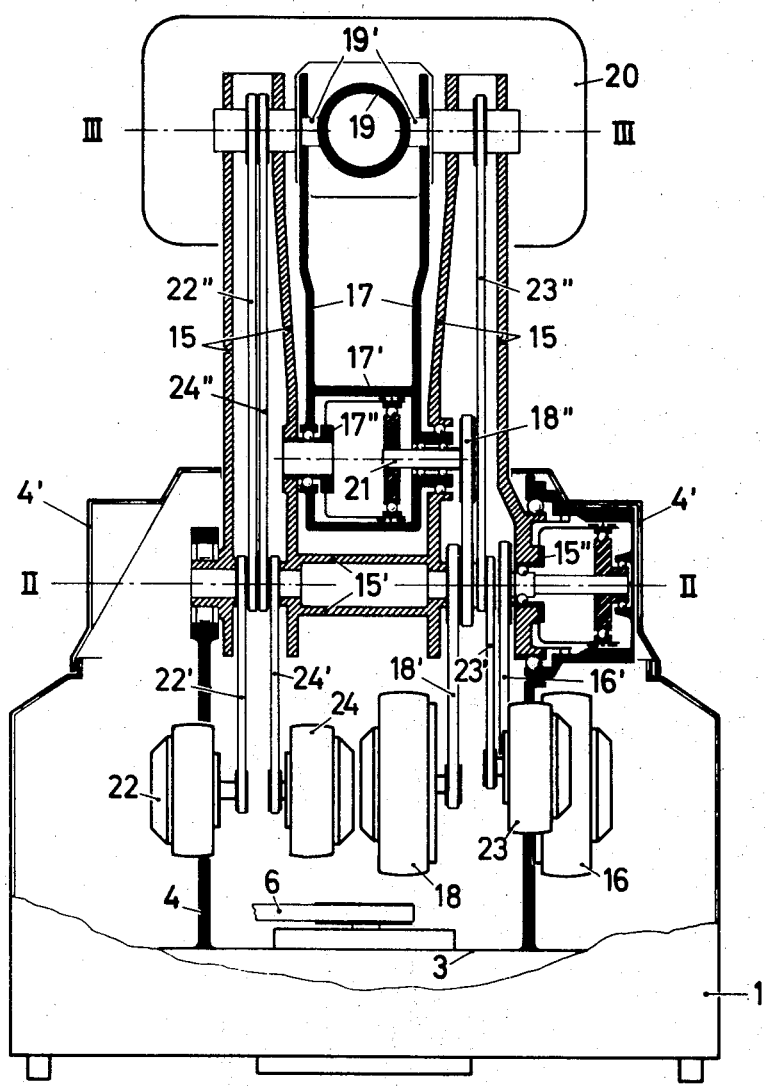
FIG. 2 is a section along the line I—I of FIG. 1.

As seen in FIG. 2 swivel base 4 comprises two plates or vanes 4' that project upwards from frame 1. Between two vanes 4' there is a pair of upper arms 15 mounted so as to be pivotal about a horizontal axis II—II. Both upper arms 15 have a hollow box cross-section and are paired to form a rigid unit by a hollow shaft 15'. The structure is placed or retained at any angular position on its fixed supporting hollow journal 15'' by a reduction gear of the kind described above for rotary disc 3. The internally toothed rigid steel ring is fixed to one of the vanes 4' of the swivel base 4 and the bearing is moved by an electric motor 16 mounted on base 4 and coupled by a belt 16'.

As shown in FIG. 2, a link 17 is connected between upper arms 15. Link 17 is pivotal about a horizontal shaft 21, the cross-section of the link is also that of a hollow box. Hollow shaft 17' can be moved to and retained in any angular position by an electric motor 18 with a belt 18', an intermediate shaft with a pair of belt drives on the horizontal axis II—II, and belt 18''. The drive is completed by a reduction gear of the kind already described, but with the difference that the resilient externally toothed steel bush of the reduction gear is carried on a bush 17'' secured to one of upper arms 15. The internally toothed rigid steel ring of the gearing is fastened to hollow shaft 17'.

That end of strut 17 remote from its swivel base shaft has a sliding block 19 which is retained on a swivel pin 19'. Pin 19' is defined so as to be horizontally rotatable in strut 17, and is inserted in a longitudinal guide of a lower arm 20. Arm 20 at its rear portion is pivotal about a horizontal axle III—III in the pair of upper arms 15, and thus forms an elbow joint. On axle III—III there are three belt drives 22'', 23'' and 24'' for producing three pivotal movements of the holder. The drives are from electric motors 22, 23 and 24 each is mounted on the base 4 by belts 22', 23' and 24' that extend between the motors and belt pulleys on axle line II—II.

Figure 4:
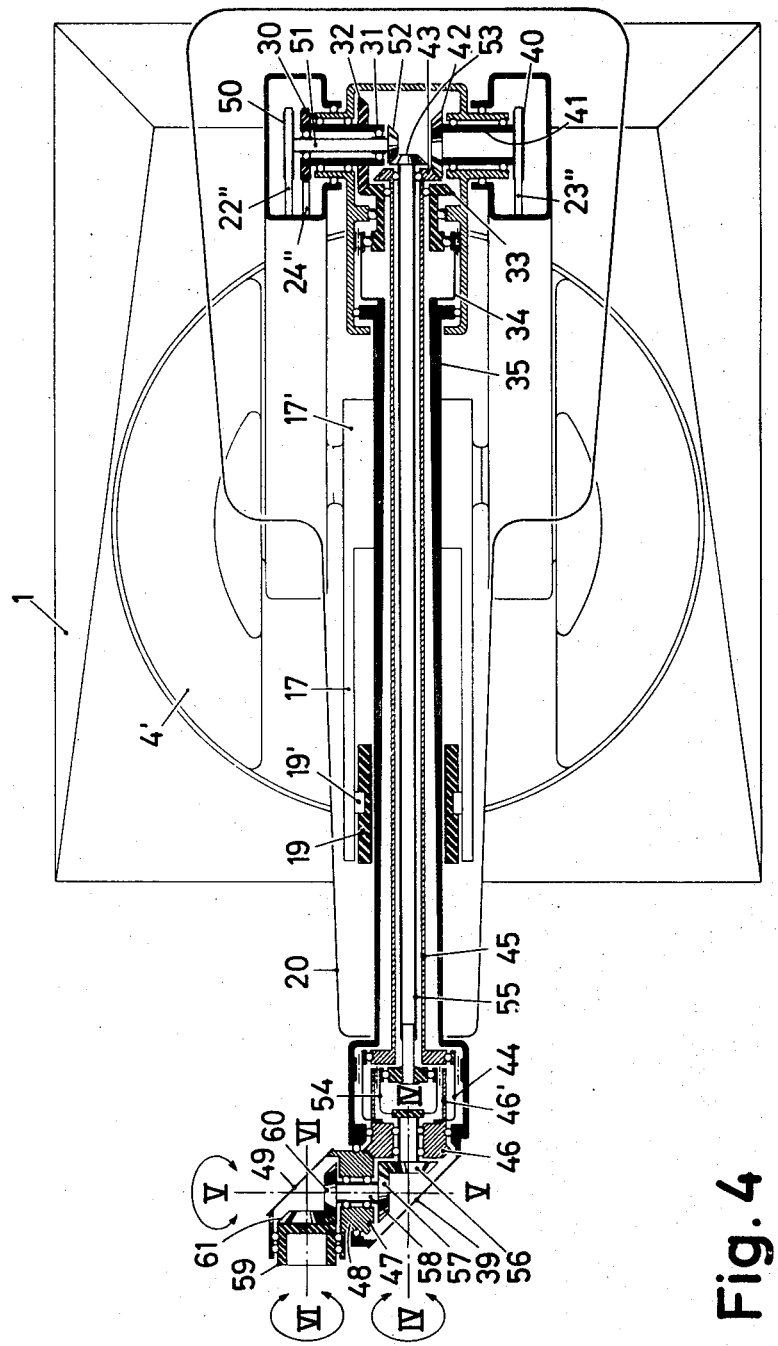
FIG. 4 is a plan view of the inventive arm showing the section, the gripper and bearings therefor.

Belt 24'' drives a belt pulley 30 as best seen in FIG. 4. A bevel gear 32 is connected to pulley 30 by a shaft 31. A bevel gear 33 meshing therewith is in operating engagement with a swivel tube 35 by means of a reduction gear 34 of the kind described above. Swivel tube 35 extends over most of the length of the lower arm 20 and projects therefrom at its free end. The free end supports a wrist member 39 adapted to be swivelled around swivel axle line IV—IV and retains the latter in the required swivel angle position.

Belt 23'' drives a belt pulley 40 to which a bevel gear 42 is connected by a hollow shaft 41. Bevel gear 43 meshing therewith is mounted on a hollow shaft 45 which is located coaxially within swivel tube 35 and at its end projection into the wrist member 39, drives a reduction gear 44 of the kind described above. The internally toothed resilient steel ring is supported on a section of swivel tube 35 of wrist member 39 and its externally toothed steel bush is connected to a driven bevel gear 46. A bevel gear 47 meshes with the latter, the hollow support shaft 48 of which extends coaxially with the swivel axle line V—V of a first hand member 49 mounted in the wrist member 39 and pivotal around line V—V. Thus, first hand member 49 is retained in its required swivel angle position.

A belt 22'' drives a belt pulley 50, with which a bevel gear 52 is connected by a shaft 51. Bevel gear 53 meshing therewith is mounted on a hollow shaft 55, which is located coaxially within the hollow shaft 45 and at its end projecting into the wrist member 39, drives a reduction gear of the kind described above. The internally toothed rigid steel ring is supported on a shoulder 46' of the bevel gear 46 and its associated externally toothed resilient steel bush is coaxially telescoped into the bush of the reduction gear for first hand member 49, and is connected to a driven bevel gear 56. Meshing with the latter is a bevel gear 57, the shaft 58 of which extends coaxially with the swivel axle line V—V and supports a bevel gear 60 in the first hand member 49. Bevel gear 60 meshes with a bevel gear 61 of the first hand member. A bevel gear 61 is connected to a second hand member 59 pivotal through 360° about the axle line VI—VI and retains it in its given swivel angle position.

The three hand-member axes IV—IV, V—V and VI—VI are at right angles to each other. The pivoting action about axle line IV—IV provides the two hand members 49 and 59 with the pivotal action of the human lower arm. And, the pivoting action about the axle lines V—V and VI—VI imparts to the second hand member (the holder) the movement of the human hand on and about its wrist.

Figure 3:
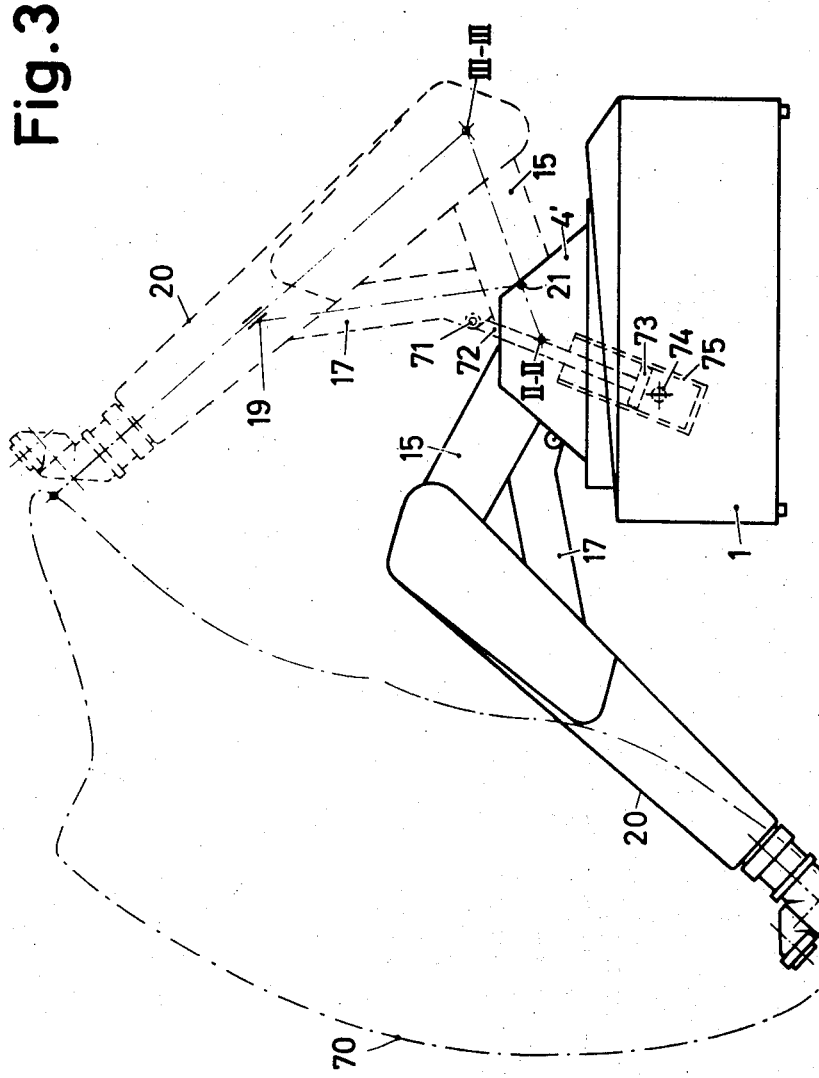
FIG. 3 is on a reduced scale and shows the apparatus of FIG. 1 with the arm in two different positions.

The holder can pivot about the three hand member axes up to 360°. FIG. 3 shows by a chain dotted line 70, the surface area in a vertical plane which may be embraced by using the pivoting action of the upper and lower arms about axle lines III—III and II—II. Rotation about the axle line I—I may also extend to 360°, but in practice this is found unnecessary.

Referring again to FIG. 3, there is shown a connecting rod 72 with a piston 73 which slides in an air cylinder 75 hingedly supported on the swivel base 4. Rod 72 engages strut 17 at point 71 to provide a weight compensation in the sweep positions.

Figure 5:
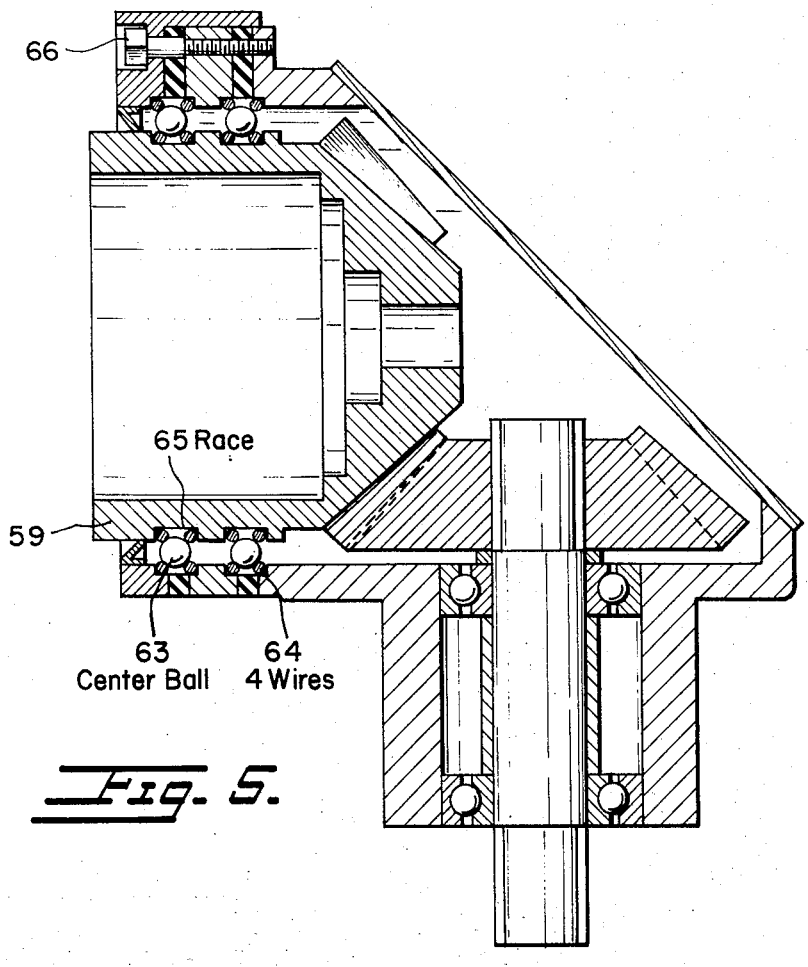
FIG. 5 shows the second part of the gripper of FIG. 4 on an enlarged scale and in section.

FIG. 5 shows the means which enable second hand member 59 to swivel as much as 360°. This is accomplished by mounting it on a wire ball bearing. Balls 63 thereof move along wire rings 64 which are located in recesses of their respective races 65 which are held against one another by bolts 66. This gives a clearance-free adjustment that allows for pre-tension and readjustment, should this appear necessary during operation.

In operation, the program required for operating the device is stored in a central control unit (not shown) which imparts the control commands to the electric motors which are necessary to produce the required manipulation. The program itself is produced by moving the electric motors first by hand so that the required handling operation is carried out. Signal generators (not shown) provided at the driven parts of the reduction gears (coders) generate signals corresponding to the handling movement desired. These signals are stored in the central control unit and in their entirety provide the program. During mechanical (or automatic) handling the stored signals are then compared with the signals emitted by the signal generators (comparison of actual value and nominal value) and the differences used to produce control commands for the electric motors. The program may be wholly or partially obliterated or varied at any time.

While only one embodiment of the present invention has been shown and described, it will be apparent to those skilled in the art that many changes and modifications may be made thereto without departing from the invention's spirit and scope.

What is claimed is:

1. An automatic mechanical handling apparatus responsive to automatic control from a variable program comprising in combination:
   a frame including pivot means;
   a rotatable base coupled to said pivot means and including a pair of parallel spaced apart support members, said pivot means capable of rotating said base about a vertical axis;
   a pair of upper arms on one end pivotable about and supported on a horizontal axis defined between the support members;
   a lower arm on one end pivotable between the free end of said upper arms so as to form an elbow joint, said lower arm including shaft means independently rotatable therein;
   holder means rotatably journaled at the free end of said lower arm, said holder means coupled with and driven by said shaft means, said holder means containing gear means, the latter means being driven by said shaft means;
   slide means journaled about said shaft means;
   a link member on one end coupled to said slide means while on the other end is pivotably connected between said pair of upper arms, said other end of the link member including belt drive means for rotating said link about said other end thereby causing said lower arm to pivot about the elbow joint; and
   drive means including a plurality of reduction gear means and belt and pully means for independently rotating said shaft means to cause said holder means to move and pivot in all directions.

2. The combination as recited in claim 1 wherein said shaft means comprises a hollow tube, and a pair of co-axial shafts concentrically confined within said hollow tube, said hollow tube and co-axial shafts each independently rotatable by said drive means.

3. The combination as in claim 2 wherein said holder means comprises a wrist member having reduction and bevel gears, said reduction and bevel gears of said wrist member driven by the reduction gears of said co-axial shafts, a first hand member containing reduction and bevel gears, said reduction and bevel gears of said first hand member being driven by said reduction and bevel gears of said wrist member, a second hand member having reduction and bevel gears, said reduction and bevel gears of said second hand member being driven by said reduction and bevel gears of said first hand member thereby allowing said second hand member to pivot about three perpendicular axes.

4. The combination as in claim 3 wherein said pivot means comprises an elliptical disc, a ball bearing race on said disc, a resilient externally toothed steel bush running on the periphery said race, and internally toothed rigid circular steel ring of identical pitch with said bush teeth said ring having a greater number of teeth than said bush, said bush and said ring being so dimensioned that the teeth of said bush in the region of the larger elliptical axis of said bush are in constant engagement with the teeth of said ring, said base being connected to said disc so that as motive power is supplied to said bush, said base may pivot to any desired position.

5. The combination as in claim 4 wherein said drive means comprises a plurality of electric motors each coupling and driving one of said plurality reduction gear means with one of the belt and pulley means for independently driving each of said hollow tube and said pair of co-axial shafts thereby allowing independent rotation of said wrist, said first hand, and said second hand.

6. The combination as in claim 5 wherein a plurality of adjustable wire ball bearings is rotatably supporting said second hand, said bearings including races that are held against one another by a plurality of bolts so as to allow for pretensioning of said bearings.

7. The combination as in claim 5 wherein said plurality of electric motors are contained in said frame.

8. The combination as in claim 4 wherein each of the ends of said co-axial shafts and said hollow tube located in the elbow joint contain one of said plurality of reduction gear means so that one of said plurality of belt and pulley means when each is independently driven by one of said plurality of electric motors will cause said holder means to rotate about three perpendicular axes.

9. The combination as in claim 7 further including hydraulic means for actuating said link in conjunction with the belt drive means thereby pivoting said lower arm about said elbow joint.

10. The combination as in claim 9 wherein the reduction and bevel gears for said second hand, the reduction and bevel gears of said first hand, and the reduction and bevel gears of said wrist are supported by an enclosed bush member integrally formed at the free end of said hollow tube.

* * * * *